United States Patent [19]

Takahashi et al.

[11] Patent Number: 5,283,286

[45] Date of Patent: *Feb. 1, 1994

[54] IMPACT-RESISTANT THERMOPLASTIC RESIN COMPOSITION CONTAINING A GRAFTED BUTADIENE RUBBER

[75] Inventors: Yosuke Takahashi; Yasumasa Komatsu; Hiroshi Hagiwara; Takayuki Katto, all of Iwaki, Japan

[73] Assignee: Kureha Kagaku Kogyo Kabushiki Kaisha, Tokyo, Japan

[*] Notice: The portion of the term of this patent subsequent to Mar. 2, 2010 has been disclaimed.

[21] Appl. No.: 879,999

[22] Filed: May 8, 1992

[30] Foreign Application Priority Data

May 10, 1991 [JP] Japan .................. 3-133403

[51] Int. Cl.⁵ .................. C08L 51/04; C08L 35/06
[52] U.S. Cl. .................. 525/75; 525/64; 525/67; 525/80; 525/84; 525/86; 525/191; 525/242; 525/210; 525/222; 525/238; 525/301; 525/310
[58] Field of Search .................. 525/75, 70, 84, 86, 525/80, 242, 210, 222, 238, 301

[56] References Cited

U.S. PATENT DOCUMENTS

| | | | |
|---|---|---|---|
| 2,908,661 | 10/1959 | Calvert | 525/316 |
| 3,463,833 | 8/1969 | Isogawa | 525/84 |
| 5,191,018 | 3/1993 | Hagiwara et al. | 525/86 |

FOREIGN PATENT DOCUMENTS

| | | |
|---|---|---|
| 0026162 | 4/1983 | European Pat. Off. . |
| 0173812 | 3/1986 | European Pat. Off. . |
| 0488799 | 6/1992 | European Pat. Off. . |
| 33-9797 | 11/1958 | Japan . |
| 35-5996 | 5/1960 | Japan . |
| 35-13235 | 9/1960 | Japan . |
| 35-18194 | 12/1960 | Japan . |
| 4-1931 | 2/1965 | Japan . |
| 42-13616 | 8/1967 | Japan . |
| 44-15902 | 7/1969 | Japan . |
| 45-18016 | 6/1970 | Japan . |
| 45-33304 | 10/1970 | Japan . |
| 46-37415 | 11/1971 | Japan . |

*Primary Examiner*—James J. Seidleck
*Assistant Examiner*—M. L. Warzel
*Attorney, Agent, or Firm*—Wenderoth, Lind & Ponack

[57] ABSTRACT

A thermoplastic resin composition is prepared by blending 50-95 wt. % of a copolymer (A) of 10-75 wt. % of α-methyl styrene, 10-60 wt. % of methyl methacrylate, 5-35 wt. % of acrylonitrile and 0-20 wt. % of a monomer copolymerizable therewith; and 5-50 wt. % of a graft copolymer (B) comprising 50-85 wt. parts of a butadiene-based rubber polymer and 15-50 wt. parts of a vinyl monomer graft-polymerized onto the rubber polymer. The butadiene-based rubber polymer includes 50-98 wt. % of butadiene, 2-50 wt. % of an aromatic polycyclic vinyl monomer represented by a formula (I) below and 0-20 wt. % of a monomer copolymerizable therewith:

$$R-\underset{\underset{R_1}{|}}{C}=CH_2, \tag{I}$$

wherein R denotes an optionally substituted biphenylyl or naphthyl group, and $R_1$ denotes a hydrogen atom or a methyl group. The thermoplastic resin composition is provided with a good balance among heat-resistance, impact resistance, transparency and processability because the graft copolymer (B) using an aromatic polycyclic vinyl monomer shows a good impact resistance-modifying effect while retaining a relatively high refractive index and the copolymer (A) shows a good heat resistance and a relatively low refractive index.

14 Claims, No Drawings

IMPACT-RESISTANT THERMOPLASTIC RESIN COMPOSITION CONTAINING A GRAFTED BUTADIENE RUBBER

FIELD OF THE INVENTION AND RELATED ART

The present invention relates to a novel thermoplastic resin composition with excellent transparency, heat resistance and impact resistance. More particularly, the present invention relates to a thermoplastic resin composition which includes a graft copolymer comprising as a trunk component a rubber copolymer of butadiene with an aromatic polycyclic vinyl monomer of biphenyl derivative or a naphthalene derivative having a high refractive index and a low glass transition temperature, and an α-methyl styrene/methyl methacrylate/acrylonitrile copolymer, and is provided with heat resistance, transparency and impact resistance in combination.

A rubber-containing acrylonitrile/styrene copolymer composition (hereinafter sometimes abbreviated as "ABS resin") has been widely utilized because of good processability and excellent impact resistance but is also accompanied with defects, such as a low heat resistance (heat distortion temperature) and poor transparency. Various proposals have been made in order to obviate the defects.

In order to improve the heat resistance, for example, there have been proposed (1) to substitute α-methylstyrene (hereinafter abbreviated as "αMS") for styrene (St) of St and acrylonitrile (AN) as grafting components onto the rubber (U.S. Pat. No. 2,908,661); (2) to blend an ABS resin with an αMS/AN copolymer (Japanese Patent Publication (JP-B) 35-18194); (3) to exercise a two-stage grafting process wherein St and AN and grafted on a rubber and then αMS and AN are further grafted thereon (JP-B 42-13616); (4) to blend an ABS resin with an αMS/methyl methacrylate (MMA)/AN copolymer (JP-B 45-18016, 45-33304 and 44-15902); and (5) to blend an αMS/MMA/AN copolymer with a graft copolymer obtained by graft-polymerizing MMA, St and AN onto a rubber (JP-B 46-37415). In case where αMS and/or MMA is used to substitute for at least a part of conventional resin components of St and MMA, an improved heat resistance has been attained but it has not been possible to obtain a composition having a good transparency.

Various proposals have also been made so as to provide the ABS resin with an improved transparency. A basic thought for the purpose is to cause the rubber component and the resin component of an ABS resin to have refractive indices which are close to each other.

The resin phase generally has a higher refractive index. Accordingly, various proposals have been made to incorporate MMA in the resin phase to provide a lower refractive index which approaches the low refractive index of the rubber phase (JP-B 33-9797, 35-5996 and 35-13235). This resort alone may provide an improved transparency but it is difficult to realize an improved heat resistance.

On the other hand, based on a concept of using a rubber phase having an increased refractive index closer to that of the resin phase, it has been also proposed to use as the rubber a butadiene/styrene copolymer with an increased styrene content (JP-B 40-1931). This method is, however, accompanied with a difficulty that the rubber phase is caused to have a higher glass transition temperature so that it is difficult to obtain an ABS resin with excellent impact resistance.

It has been also proposed to combine the above two methods, i.e., to lower the refractive index of the resin phase and also increase the refractive index of the rubber phase. In this case, it is possible to provide a composition having good transparency and impact resistance but it is still insufficient to provide the composition with a satisfactory heat resistance.

SUMMARY OF THE INVENTION

An object of the present invention is to provide a thermoplastic resin composition which has a heat-resistance comparable to that of the conventional heat-resistant type ABS resin and also is excellent in transparency, impact resistance and processability.

According to our study, it has been found very effective to use an αMS/MMA/AN copolymer (A) as a resin component and combine it with a rubber component of a graft copolymer (B) obtained by graft-polymerizing a vinyl monomer onto a rubber copolymer of butadiene with an aromatic polycyclic vinyl monomer comprising a biphenyl derivative and/or a naphthalene derivative used instead of St, which rubber copolymer has a high refractive index and also a low glass transition temperature. In this instance, by appropriate selection of the vinyl monomer as the grafting component, it is possible to easily have the refractive index of the graft copolymer (B) approach that of the copolymer (A), thus providing the resultant composition with an excellent balance among heat resistance, transparency, impact resistance and also processability.

More specifically, according to the present invention, there is provided a thermoplastic resin composition, comprising:

50–95 wt. % of a copolymer (A) of 10–75 wt. % of α-methyl styrene, 10–60 wt. % of methyl methacrylate, 5–35 wt. % of acrylonitrile and 0–20 wt. % of a monomer copolymerizable therewith, and 5–50 wt. % of a graft copolymer (B) comprising 50–85 wt. parts of a butadiene-based rubber polymer and 15–50 wt. parts of a vinyl monomer graft-polymerized onto the rubber polymer, the total of the rubber polymer and the vinyl monomer being 100 wt. parts; said butadiene-based rubber polymer comprising 50–98 wt. % of butadiene, 2–50 wt. % of an aromatic polycyclic vinyl monomer represented by a formula (I) below and 0–20 wt. % of a monomer copolymerizable therewith:

$$R-\underset{\underset{R_1}{|}}{C}=CH_2, \qquad \text{Formula (I)}$$

wherein R denotes an optionally substituted biphenylyl or naphthyl group, i.e.,

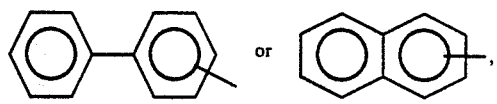

and $R_1$ denotes a hydrogen atom or a methyl group.

The above mentioned and other objects and features of the invention will be better understood upon consideration of the following detailed description concluding with specific examples.

DETAILED DESCRIPTION OF THE INVENTION

COPOLYMER (A)

First of all, explanation is made to the αMS/MMA/AN copolymer (A) which is a principal component of the thermoplastic resin composition according to the present invention. The copolymer (A) provides the thermoplastic resin composition according to the present invention with heat resistance, rigidity, tensile strength, etc. These properties, however, can vary depending on the composition of the constituting monomers.

αMS is an important component contributing to heat resistance, and a larger content thereof is preferred in view of the heat resistance. Too large a content, however, results in a lower yield at the time of the copolymerization and too high a refractive index of the resultant copolymer. Accordingly, αMS may be contained in a proportion of 10-75 wt. %, preferably 20-70 wt. %, of the total monomers providing the copolymer (A). More specifically, less than 10 wt. % is insufficient in imparting the heat resistance, and more than 75 wt. % can result in a lower yield or too high a refractive index of the copolymer (A).

MMA may be used in a proportion of 10-60 wt. % so as to lower the refractive index of the resultant copolymer (A). The refractive index $n_D$ of the copolymer (A) at 25° C. may preferably be in the range of 1.52-1.56 so as to be adjusted to that of the graft copolymer (B).

AN is effective in increasing the polymerizability of the mixture monomers, particularly in emulsion polymerization, and in increasing the impact resistance and the resistance to thermal decomposition. An excessive amount, however, results in a lower heat resistance. Accordingly, AN may be used in a proportion of 5-35 wt. %, preferably 10-30 wt. %.

The monomer copolymerizable with the above-mentioned monomers as the essential components, i.e., αMS, MMA and AN, may for example include St, methacrylonitrile, methacrylic acid, acrylic acid, and maleimides, such as N-methylmaleimide, N-phenylmaleimide and N-cyclohexylmaleimide, and may be used as desired in a small amount in the range of 0-20 wt. % in order to improve the polymerization velocity or impart other properties.

Basically, any polymerization process may be used for obtaining the copolymer (A) from the above-mentioned monomers, but emulsion polymerization process may most preferably be used so as to improve the velocity and yield of the polymerization while using as large a content as possible of αMS contributing to the heat resistance. The emulsion polymerization may be performed in a known manner by using a peroxide, an emulsifier, a polymerization promoter, etc., as desired. It is possible to add all the monomer mixture at a time to the polymerization system, for polymerization, to divide the monomer mixture into portions and separately add the portions to the polymerization system for polymerization, or to continue the polymerization while continuously adding a monomer or a monomer mixture into the polymerization system. It is also possible to use a polymerization degree controller, such as a mercaptan, in order to control the molecular weight of the resultant copolymer.

GRAFT COPOLYMER (B)

The graft copolymer (B) as another essential component of the thermoplastic resin composition according to the present invention functions as an impact resistance modifier having a low grass transition temperature and an increased refractive index.

RUBBER POLYMER

The rubber polymer constituting the trunk polymer of the graft copolymer (B) may be a butadiene-based rubber polymer obtained preferably by a known manner of emulsion polymerization of a monomer mixture comprising 50-98 wt. %, preferably 60-95 wt. %, more preferably 75-95 wt. %, of butadiene, and 2-50 wt. %, preferably 5-40 wt. %, more preferably 5-25 wt. %, of an aromatic polycyclic vinyl monomer represented by the formula (I) below:

wherein R denotes an optionally substituted biphenylyl or naphthyl group, and $R_1$ denotes a hydrogen atom or a methyl group. Examples of the substituent optionally possessed by the biphenylyl or naphthyl group may include: alkyl groups having 1-3 carbon atoms, and halogen atoms, such as fluorine and chlorine.

Preferred examples of the aromatic polycyclic vinyl monomer represented by the formula (I) and copolymerized with butadiene may include: vinylbiphenyl compounds, such as 4-isopropenylbiphenyl, 3-isopropenylbiphenyl and 4-vinylbiphenyl, and their alkyl-substituted derivatives; and vinylnaphthalene compounds, such as 2-isopropenylnaphthalene and 2-vinylnaphthalene, and their alkyl-substituted derivatives.

Among the above-mentioned aromatic polycyclic vinyl monomers, 3-isopropenylbiphenyl is liquid at room temperature and is most preferred in view of the easiness of handling.

If the content of the aromatic polycyclic vinyl monomer is below 2 wt. %, it is impossible to effectively increase the refractive index of the resulting rubber polymer. On the other hand, a proportion exceeding 50 wt. % of the aromatic polycyclic vinyl monomer is not preferred because the resulting rubber polymer is caused to have an elevated glass transition temperature, thus losing rubbery properties. The rubber polymer may preferably have a glass transition temperature of −20° C. or below, particularly in the range of −30° to −70° C.

The rubber polymer thus obtained may preferably have a refractive index $n_D$ at 25° C. in the range of 1.52-1.56. A refractive index below 1.52 is not substantially different from that of polybutadiene and it is difficult to obtain a composition having satisfactory heat resistance and transparency by blending the resultant graft copolymer (B) with the copolymer (A) while the composition may have a good impact resistance. A refractive index exceeding 1.56 leads to too high a glass transition temperature and thus a low impact resistance-modifying effect. When the butadiene-aromatic polycyclic vinyl monomer copolymer rubber used in the present invention is compared with a conventional butadiene-styrene copolymer rubber, the former is characterized as a rubber having a higher refractive index due to the addition of the aromatic polycyclic vinyl monomer or a rubber having a lower glass transition temperature at an identical refractive index level. Accordingly, a graft copolymer obtained from the former rubber has a larger impact resistance-modifying effect than a graft copolymer obtained from the latter rubber when compared at the same refractive index level.

Another vinyl monomer copolymerizable with the aromatic polycyclic vinyl monomer and butadiene can be used together with the aromatic polycyclic vinyl monomer within an extent not deviating from the object of the present invention. Examples of such another vinyl monomer may include: aromatic vinyl compounds, such as styrene and α-methylstyrene; vinyl cyanides, such as acrylonitrile and methacrylonitrile; acrylic acid, methacrylic acid; alkyl acrylates, such as methyl acrylate, ethyl acrylate, butyl acrylate, and ethylhexyl acrylate; and alkyl methacrylates, such as methyl methacrylate, ethyl methacrylate and butyl methacrylate. Such another vinyl monomer may be used in an amount of 0-20 wt. % of the total amount of the monomers (i.e., butadiene + the aromatic polycyclic vinyl monomer such + another vinyl monomer) so as to replace a portion of the aromatic polycyclic vinyl monomer while retaining the above-mentioned lower limit of the aromatic polycyclic vinyl monomer.

It is also possible to use a polyfunctional monomer copolymerizable with the aromatic polycyclic vinyl monomer and butadiene, as desired, to provide a cross-linked rubber polymer. The polyfunctional monomer may be used in an amount of at most 10 wt. %, preferably 0.1-5 wt. %, of the total monomer amount excluding the polyfunctional monomer. An amount exceeding 10 wt. % is not preferred because the resulting rubber polymer is caused to have an elevated glass transition temperature and a poor elastomeric property, thus lowering the impact resistance-imparting performance of the graft copolymer (B).

Examples of the polyfunctional monomer may include: aromatic polyfunctional vinyl compounds, such as divinylbenzene and divinyltoluene; di- and tri-methacrylates and di- and tri-acrylates of polyhydric alcohols, such as ethylene glycol dimethacrylate, triethylene glycol dimethacrylate, and 1,3-butanediol diacrylate, and allyl compounds, such as diallyl maleate, diallyl phthalate and allyl methacrylate. The above are not exhaustive and it is generally possible to use a compound having two or more double bonds in its molecule and copolymerizable with the aromatic polycyclic vinyl monomer and also butadiene. It is also possible to use a chain transfer agent in an amount up to 5 wt. % of the total monomer amount so as to adjust the gel content of the resulting rubber polymer. The chain transfer agent may for example be a known one ordinarily used in emulsion polymerization, such as octyl mercaptan, dodecyl mercaptan or lauryl mercaptan.

The graft copolymer (B) may be produced through an ordinary polymerization process, particularly preferably by emulsion polymerization. Correspondingly, it is preferred to prepare the above-mentioned rubber polymer through emulsion polymerization, particularly in the form of a latex having a relatively large particle size of 150-800 nm in order to provide the composition with excellent impact resistance. Such a latex having a large particle size may be obtained by a known method, such as selection of the kind and amount of an emulsifier and a polymerization initiator, and a polymerization temperature, adjustment by controlling the manner of addition of the monomer, and/or micro-coagulation of a rubber latex of a smaller particle size. The micro-coagulation may be effected in a known manner inclusive of addition of a coagulant, examples of which may include: acids including inorganic acids, such as hydrochloric acid, and organic acids, such as tartaric acid, maleic acid and acetic acid; water-soluble polymers, such as polyethylene oxide and polyvinyl alcohol; metal salts, such as sodium chloride and magnesium chloride; and a combination of a peroxide with formaldehyde sulfoxylate.

GRAFTING COMPONENT

The vinyl monomer graft-polymerized onto the rubber polymer in the present invention may suitably be one providing polymerized units which have a good compatibility with the copolymer (A) to which the resultant graft copolymer (B) is added so as to easily and uniformly disperse the rubber polymer within the copolymer (A) and provide a sufficient bonding between the copolymer (A) phase and the rubber polymer phase.

The grafting monomer component may for example be selected from the following group of monomers including: aromatic vinyl compounds, such as styrene and α-methylstyrene, vinyl cyanides, such as acrylonitrile and methacrylonitrile; acrylic acid, methacrylic acid; alkyl acrylates, such as methyl acrylate, ethyl acrylate and butyl acrylate; alkyl methacrylates, such as methyl methacrylate, ethyl methacrylate and butyl methacrylate; maleimide monomers, such as maleimide and N-phenyl-maleimide., maleic acid, maleic anhydride and their derivatives; and aromatic polycyclic vinyl monomers represented by the above-mentioned formula (I). At least one species of the monomers may be used singly or in mixture. Among the above monomers, styrene is most preferred as an aromatic vinyl compound, acrylonitrile is most preferred as a vinyl cyanide, methyl methacrylate is most preferred as an alkyl methacrylate, and butyl acrylate is most preferred as an alkyl acrylate. The aromatic polycyclic vinyl monomers are also effective as a grafting component to provide a graft copolymer having a high refractive index owing to the grafting component. Particularly, 3-isopropenylbiphenyl may be preferably used. Another copolymerizable monomer may include a polyfunctional monomer identical to those used in the rubber polymer. It is also possible to use a small amount of chain transfer agent similar to those described above.

GRAFT COPOLYMERIZATION

The graft copolymer (B) according to the present invention may be produced by graft-polymerizing 15-50 wt. parts of a vinyl monomer (or mixture) in the presence of 50-85 wt. parts (giving a total of 100 weights parts together with the vinyl monomer (mixture)) of a rubber polymer comprising 50-98 wt. % of butadiene and 2-50 wt. % of an aromatic polycyclic vinyl monomer. The above proportional ranges are preferred in view of a large impact resistance-modifying effect, and easiness of post treatments, such as salt (or acid) precipitation and drying. In the graft polymerization, the above monomer (or monomer mixture) may be polymerized in one stage, divisionally polymerized in several stages, or added and polymerized continuously.

FORMULATION

The thermoplastic resin composition according to the present invention is obtained by mixing 50-95 wt. % of the copolymer (A) and 5–50 wt. % of the graft copolymer (B). The mixing of the copolymers (A) and (B) may be performed in a known manner, e.g., by blending the respective polymers in a powder or pellet form by means of rollers, a screw kneader or a bambury mixer. It is also possible to mix the polymers respectively in a latex form, followed by salt (or acid) precipitation. It is also possible to add modifiers, such as antioxidants, stabilizers, fillers, pigments and plasticizers.

Further, it is also possible to add another thermoplastic resin, such as polyvinyl chloride, chlorinated polyvinyl chloride, polystyrene, polymethyl methacrylate, styrene-acrylonitrile copolymer, α-methylstyrene-acrylonitrile copolymer, styrene-acrylonitrile-methyl methacrylate copolymer, styrene-metyl methacrylate copolymer, polyester, or polycarbonate, within an extent not adversely affecting the properties of the composition according to the present invention.

UTILITY

The thermoplastic resin composition according to the present invention has excellent heat resistance, transparency, impact resistance, mechanical properties and processability and is useful as, e.g., materials for injection molding and extrusion, for various purposes.

EXAMPLES

Hereinbelow, the present invention will be described more specifically based on Examples and Comparative Examples, wherein "%" and "part(s)" used in describing formulations mean "% by weight" and "part(s) by weight", respectively. In respective synthesis examples, the charged amounts of the components are expressed in net quantities excluding impurities and diluents unless otherwise noted specifically. In the respective synthesis examples, generally good agreement was observed between a charged monomer composition and the resultant copolymer composition. Physical properties described in Examples described below were measured by the following methods.

GLASS TRANSITION TEMPERATURE (Tq)

i) Copolymer (A)

A sample sheet formed by hot pressing at 210° C. was placed in a DSC (differential scanning calorimeter, "DSC25" (trade name) available from Mettler Instrumente A. G.) and subjected to heating in a nitrogen atmosphere at a temperature-raising rate of 10° C./min. to obtain a temperature-process heat curve. On the curve, the base line on the lower temperature side and a tangent line between inflection points met each other to form an intersection point, the temperature of which was measured as the glass transition temperature of the sample.

ii) Graft copolymer (B)

An about 200 μm-thick sample sheet obtained by hot-pressing at about 200° C. was subjected to a viscoelasticity measurement using a tester ("Rheovibron DDV-II-EA", mfd. by Orientec K. K.) at a frequency of 110 Hz and a temperature-raising rate of 2° C./min. to measure a temperature giving a maximum appearing on a loss modulus-temperature curve, which temperature was recorded as a glass transition temperatures. In case where plural glass transition temperatures are observed, the lowest one corresponds to the glass transition temperature of the rubber polymer in the graft copolymer (B).

REFRACTIVE INDEX ($n_D^{25}$)

Pressed sheet samples of a copolymer (A) and a graft copolymer (B) prepared as described above were subjected to measurement by using an Abbe's refractometer at 25° C.

AVERAGE PARTICLE SIZE

The average particle size of a polymer in a latex form was measured by using a submicron particle size analyzer ("Coulter Counter N4", mfd. by Coulter Electronics Co.).

HEAT DISTORTION TEMPERATURE

A mixture of a copolymer (A) and a graft copolymer (B) was kneaded for 3 min. on kneading rollers at a surface temperature of about 200° C. and pressed in a hot press having a hot plate temperature of 220° C. to form a bar-shaped specimen (6.4×12.7×130 mm), which was then subjected to measurement under a load of 18.5 Kg/cm² according to ASTM D-548.

IZOD IMPACT STRENGTH

A bar-shaped product prepared in the same manner as the specimen for the measurement of heat distortion temperature was formed into a test piece (with a V-notch of R=0.25 and a depth of 2.5 mm) according to ASTM D-256, which was then used for measurement at 23° C.

TOTAL LIGHT TRANSMITTANCE

A 3 mm-thick plate-shaped product prepared through kneading and hot pressing in the same manner as the preparation of the specimen for the heat distortion temperature measurement, and a test piece of 50×50 mm was cut out from the product and subjected to measurement by means of a haze meter ("TCH 3DP", mfd. by Tokyo Denshoku K. K.) according to JIS K7105.

SYNTHESIS EXAMPLE 1: COPOLYMER A-1

Into a polymerization vessel, 250 parts of deionized water and 1.5 parts of sodium dodecylbenzenesulfonate were charged, and the mixture was aerated with nitrogen under sufficient stirring and heated under a nitrogen stream to 60° C. After the temperature being raised to 60° C., 0.0025 part of ferrous sulfate, 0.01 part of disodium ethylenediamine-tetraacetate (hereinafter abbreviated as "EDTA"), and 0.05 part of sodium formaldehyde sulfoxylate (abbreviated as "SFS") were added. To the mixture, a mixture of 35 parts of α-methylstyrene (αMS), 45 parts of methyl methacrylate (MMA), 20 parts of acrylonitrile (AN), 0.3 part of cumene hydroperoxide (CHP) and 0.2 part of t-dodecylmercaptan (TDM), and 20 parts of a 0.0075% SFS aqueous solution, were continuously added through separate lines but simultaneously over 8 hours. After the addition, the system was further stirred for 2 hours at 60° C.

The resultant emulsion was subjected to salting-out with aluminum sulfate and neutralized with sodium pyrophosphate (TEPY), followed by washing with water, filtration, removal of the yet-unreacted monomers by extraction with methanol and drying to obtain a copolymer A-1.

SYNTHESIS EXAMPLE 2: COPOLYMER A-2

A copolymer A-2 was prepared in the same manner as in Synthesis Example 1 except that the amounts of αMS, MMA and AN were changed to 44 parts, 46 parts and 10 parts, respectively.

SYNTHESIS EXAMPLE 3: COPOLYMER A-3

In a polymerization vessel, 250 parts of deionized water, 1.5 parts of sodium dodecylbenzene-sulfonate and 44 parts of αMS were charged, and the mixture was aerated with nitrogen under sufficient stirring and heated to 60° C. under a nitrogen stream.

After the temperature had been raised to 60° C., 0.0025 part of ferrous sulfate, 0.01 part of EDTA, 0.05 part of SFS, 0.3 part of CHP and 0.2 part of TDM were added. To the system, a mixture of 43 parts of MMA and 13 parts of AN, and 20 parts of a 0.0075% SFS aqueous solution, were continuously added through separate lines but simultaneously over 6 hours. After the addition, the system was further stirred for 1 hour at 60° C.

The resultant emulsion was further post-treated in the same manner as in Synthesis Example 1 to obtain a copolymer A-3.

SYNTHESIS EXAMPLE 4: COPOLYMER A-4

In a polymerization vessel, 250 parts of deionized water, 1.5 parts of sodium dodecylbenzene-sulfonate, 50 parts of αMS, 30 parts of MMA and 20 parts of AN were charged, and the resultant mixture was aerated with nitrogen under sufficient stirring and heated to 60° C. After the temperature had been raised to 60° C., a mixture of 0.00042 part of ferrous sulfate, 0.002 part of EDTA, 0.008 part of SFS, 0.05 part of CHP and 0.03 part of TDM divided into three portions was added to the system at an interval of 2 hours between portions. After the addition, the system was further stirred for 2 hours at 60° C.

The resultant emulsion was post-treated in the same manner as in Synthesis Example 1 to obtain a copolymer A-4.

SYNTHESIS EXAMPLE 5: COPOLYMER A-5

In a polymerization vessel, 250 parts of deionized water, 1.5 parts of sodium dodecylbenzene-sulfonate and 25 parts of αMS were charged, and the mixture was aerated with nitrogen under sufficient stirring and heated to 60° C. under a nitrogen stream.

After the temperature had been raised to 60° C., 0.0025 part of ferrous sulfate, 0.01 part of EDTA, 0.05 part of SFS, 0.3 part of CHP and 0.2 part of TDM were added. To the system, a mixture of 31 parts of αMS, 33 parts of MMA and 11 parts of AN, and 20 parts of a 0.0075% SFS aqueous solution, were continuously added through separate lines but simultaneously over 6 hours. After the addition, the system was further stirred for 1 hour at 60° C.

The resultant emulsion was further post-treated in the same manner as in Synthesis Example 1 to obtain a copolymer A-5.

SYNTHESIS EXAMPLE 6: COPOLYMER A-6

In a polymerization vessel, 250 parts of deionized water, 1.5 parts of sodium dodecylbenzene-sulfonate and 70 parts of αMS were charged, and the mixture was aerated with nitrogen under sufficient stirring and heated to 60° C. under a nitrogen stream.

After the temperature had been raised to 60° C., 0.0025 part of ferrous sulfate, 0.01 part of EDTA, 0.05 part of SFS, 0.3 part of CHP and 0.2 part of TDM were added. To the system, 30 parts of AN and 20 parts of a 0.0075% SFS aqueous solution were continuously added through separate lines but simultaneously over 6 hours. After the addition, the system was further stirred for 1 hour at 60° C.

The resultant emulsion was further post-treated in the same manner as in Synthesis Example 1 to obtain a copolymer A-6 (for comparison).

SYNTHESIS EXAMPLE 7: COPOLYMER A-7

A copolymer A-7 (for comparison) was prepared in the same manner as in Synthesis Example 6 except that the amounts of αMS and AN were changed to 75 parts and 25 parts, respectively.

The composition, polymerization yield, glass transition temperature and refractive index of each of the above-obtained copolymers A-1 to A-7 are inclusively shown in Table 1 appearing hereinafter.

SYNTHESIS EXAMPLE 8: GRAFT COPOLYMER B-1

A stainless steel autoclave equipped with a stirrer was charged with the following composition of materials, followed by aeration with nitrogen, gas-evacuation and heating to 80° C.

| | |
|---|---|
| 3-Isopropenylbiphenyl (purity: 99.5%, hereinafter abbreviated as "3-IPB") | 8.4 part(s) |
| TDM | 0.2 part(s) |
| Diisopropylbenzene hydroperoxide (purity 50%, abbreviated as "HPO") | 0.15 part(s) |
| TEPY | 0.125 part(s) |
| EDTA | 0.00375 part(s) |
| Ferrous sulfate | 0.00225 part(s) |
| Potassium oleate (abbreviated as "OLK") | 0.0775 part(s) |
| Deionized water | 200 part(s) |

After the temperature within the autoclave reached 80° C., 56.6 parts of 1,3-butadiene (abbreviated as "BD") was added, and then 0.03 part of SFS was added to start emulsion polymerization. After 2 hours from the start of polymerization, 0.33 part of OLK was added. From after further 15 min. (after 2 hours and 15 min. from the start of polymerization), 0.09 part of HPO and 0.09 part of SFS were intermittently added. The polymerization conversion after 5 hours from the start of polymerization was almost 100%. The resultant rubber polymer latex showed an average particle size of 79 nm.

The latex was cooled to 60° C., and 5 parts of 8.8%-SFS aqueous solution and 0.65 part of 35%-hydrogen peroxide aqueous solution were added, followed by 5 min. of stirring. After further 2.5 hours, 9 parts of 3%-sodium hydroxide, 0.5 part of OLK and 100 parts of deionized water were added to enlarge the rubber particles by coagulation, thus providing an average particle size of 190 nm.

To the latex thus-obtained were added the following monomers and polymerization aids, followed by 4 hours of graft polymerization at 60° C.

| | |
|---|---|
| MMA | 12.25 part(s) |
| St | 5.25 part(s) |
| TDM | 0.0875 part(s) |
| HPO | 0.15 part(s) |

| SFS | 0.15 part(s) |
|---|---|
| Deionized water | 1 part(s) |

Further, the following monomers and polymerization aids were added and subjected to 4 hours of graft polymerization at 60° C.

| MMA | 12.25 part(s) |
|---|---|
| St | 5.25 part(s) |
| TDM | 0.0875 part(s) |
| HPO | 0.15 part(s) |
| SFS | 0.15 part(s) |
| Deionized water | 1 part(s) |

After adding an antioxidant emulsion, the latex was subjected to acid precipitation with hydrochloric acid aqueous solution, dewatering, washing with water and drying to obtain a graft copolymer B-1 in powder form.

SYNTHESIS EXAMPLE 9: GRAFT COPOLYMER B-2

A stainless steel autoclave equipped with a stirrer was charged with the following composition of materials, followed by nitrogen aeration, gas-evacuation and heating to 80° C.

| 3-IPB | 10.3 part(s) |
|---|---|
| TDM | 0.25 part(s) |
| HPO | 0.15 part(s) |
| TEPY | 0.125 part(s) |
| EDTA | 0.00375 part(s) |
| Ferrous sulfate | 0.4 part(s) |
| OLK | 0.0775 part(s) |
| Deionized water | 200 part(s) |

After the temperature within the autoclave reached 80° C., 69.7 parts of BD was added, and then 0.03 part of SFS was added to start emulsion polymerization. After 15 hours from the start of polymerization, 0.37 part of OLK was added. After a further 5 hours (after 20 hours from the start of polymerization), 0.25 part of HPO and 0.25 part of SFS were intermittently added. The polymerization conversion after 35 hours from the start of polymerization was almost 100%.

The latex was cooled to 60° C., and the following monomers and polymerization aids were added thereto, followed by 3 hours of graft polymerization at 60° C.

| MMA | 7.0 part(s) |
|---|---|
| St | 3.0 part(s) |
| TDM | 0.05 part(s) |
| HPO | 0.15 part(s) |
| SFS | 0.15 part(s) |
| Deionized water | 1 part(s) |

Further, the following monomers and polymerization aids were added and subjected to 4 hours of graft polymerization at 60° C.

| MMA | 7.0 part(s) |
|---|---|
| St | 3.0 part(s) |
| TDM | 0.05 part(s) |
| HPO | 0.15 part(s) |
| SFS | 0.15 part(s) |
| Deionized water | 1 part(s) |

The thus-obtained latex was post-treated in the same manner as in Synthesis Example 8 to obtain a graft copolymer B-2.

SYNTHESIS EXAMPLE 10: GRAFT COPOLYMER B-3

A stainless steel autoclave equipped with a stirrer was charged with the following composition of materials, followed by nitrogen aeration, gas-evacuation and heating to 80° C.

| 4-Isopropenylbiphenyl | 15.0 part(s) |
|---|---|
| (purity: 99.5%, abbreviated as "4-IPB") | |
| Divinylbenzene | 0.15 part(s) |
| (purity 57.2%, abbreviated as "DVB") | |
| HPO | 0.15 part(s) |
| TEPY | 0.125 part(s) |
| EDTA | 0.00375 part(s) |
| Ferrous sulfate | 0.00225 part(s) |
| OLK | 0.45 part(s) |
| Deionized water | 200 part(s) |

After the temperature within the autoclave reached 80° C., 60.0 parts of BD was added, and then 0.03 part of SFS was added to start emulsion polymerization. After 4 hours from the start of polymerization, 0.39 part of OLK was added. After a further 1 hour (after 5 hours from the start of polymerization), 0.375 part of HPO and 0.375 part of SFS were intermittently added. The polymerization conversion after 11 hours from the start of polymerization was almost 100%.

The latex was cooled to 60° C. and the following monomers and polymerization aids were added and subjected to 3 hours of graft polymerization at 60° C.

| MMA | 10.5 part(s) |
|---|---|
| Butyl acrylate | 2.0 part(s) |
| (abbreviated as "BA") | |
| HPO | 0.15 part(s) |
| SFS | 0.15 part(s) |
| Deionized water | 5.7 part(s) |

Further, the following monomers and polymerization aids were added and subjected to 4 hours of graft polymerization at 60° C.

| St | 12.5 part(s) |
|---|---|
| HPO | 0.2 part(s) |
| SFS | 0.2 part(s) |
| Deionized water | 7.6 part(s) |

The resultant latex was post-treated in the same manner as in Synthesis Example 8 to obtain a graft copolymer B-3.

SYNTHESIS EXAMPLE 11: GRAFT COPOLYMER B-4

A graft copolymer B-4 (for comparison) was prepared in the same manner as in Synthesis Example 8 except that the amount of BD was changed to 55.0 parts and 10.0 parts of St was used instead of the 3-IPB.

SYNTHESIS EXAMPLE 12: GRAFT COPOLYMER B-5

A graft copolymer B-5 (for comparison) was prepared in the same manner as in Synthesis Example 10 except that the amount of BD was changed to 45.0 parts and 30.0 parts of St was used instead of the 4-IPB.

SYNTHESIS EXAMPLE 13: GRAFT COPOLYMER B-6

A graft copolymer B-6 was prepared in the same manner as in Synthesis Example 8 except that the amounts of BD and 3-IPB were changed to 60.6 parts and 4.4 parts, respectively, and the amounts of MMA and St were changed to 10.5 parts and 5.0 parts, respectively, and 2.0 parts of 3-IPB was used in each of the first and second grafting components.

The composition, glass transition temperature, refractive index and average particle size of each of the above-obtained graft copolymers B-1 to B-6 are inclusively shown in Table 2 appearing hereinafter.

SYNTHESIS EXAMPLE 14: COPOLYMER A-8

In a polymerization vessel, 250 parts of deionized water and 1.5 parts of sodium dodecylbenzenesulfonate were charged, and the mixture was aerated with nitrogen under sufficient stirring and heated to 60° C. under a nitrogen stream.

After the temperature had been raised to 60° C., 1.9 parts of αMS, 3.1 parts of MMA, 0.0025 part of ferrous sulfate, 0.01 part of EDTA, 0.05 part of SFS and 0.3 part of CHP were added. After the addition, stirring was continued for 2 hours at 60° C. To the system, a mixture of 41.1 parts of αMS, 38.9 parts of MMA, 15 parts of AN and 0.3 part of TDM, and 33 parts of a 0.41% SFS aqueous solution, were continuously added through separate lines but simultaneously over 6 hours. After the addition, the system was further stirred for 2 hours at 60° C.

The resultant emulsion was subjected to salting-out with calcium chloride and filtrated while being washed with water, followed by removal of the yet-unreacted monomers by extraction with methanol and drying to obtain a copolymer A-8, of which the composition, polymerization yield and properties are also shown in Table 1.

SYNTHESIS EXAMPLE 15: GRAFT COPOLYMER B-7

A stainless steel autoclave equipped with a stirrer was charged with the following composition of materials, followed by aeration with nitrogen, gas-evacuation and heating to 80° C.

| | |
|---|---|
| 2-Isopropenylnaphthalene (purity: 99.8%, abbreviated as "2-IPN") | 9.75 part(s) |
| TDM | 0.2 part(s) |
| HPO | 0.15 part(s) |
| TEPY | 0.125 part(s) |
| EDTA | 0.00375 part(s) |
| Ferrous sulfate | 0.00225 part(s) |
| OLK | 0.09 part(s) |
| Deionized water | 200 part(s) |

After the temperature within the autoclave reached 80° C., 65.25 parts of BD was added to dissolve the 2-IPN in the autoclave, and then 0.03 part of SFS was added to start emulsion polymerization. After 4 hours from the start of polymerization, 0.713 part of OLK was added. After a further 1 hour (after 5 hours from the start of polymerization), 0.375 part of t-butyl hydroperoxide (abbreviated as "t-BHP") and 0.375 part of SFS were intermittently added. The polymerization conversion after 18 hours from the start of polymerization was almost 100%. The resultant rubber polymer latex showed an average particle size of 220 nm, and the rubber polymer showed a refractive index $n_D$ of 1.5372 at 23° C.

The latex thus-obtained was cooled to 60° C., and the following monomers and polymerization aids were added thereto and subjected to 3 hours of graft polymerization at 60° C.

| | |
|---|---|
| MMA | 10.5 part(s) |
| BA | 2.0 part(s) |
| t-BHP | 0.15 part(s) |
| SFS | 0.15 part(s) |
| Deionized water | 1 part(s) |

Further, the following monomers and polymerization aids were added and subjected to 4 hours of graft polymerization at 60° C.

| | |
|---|---|
| St | 12.5 part(s) |
| t-BHP | 0.2 part(s) |
| SFS | 0.2 part(s) |
| Deionized water | 1 part(s) |

The thus-obtained latex was post-treated in the same manner as in Synthesis Example 8 to obtain a graft copolymer B-7, of which the characterizing parameters are also shown in Table 2.

SYNTHESIS EXAMPLE 16: GRAFT COPOLYMER B-8

In a glass-made pressure-resistant vessel, the following composition of monomers and polymerization aids was charged and subjected to 12 hours of emulsion polymerization at 60° C.

| | |
|---|---|
| BD | 63.75 part(s) |
| 4-Vinylbiphenyl (purity: 98%, abbreviated as "4-VB") | 11.25 part(s) |
| DVB | 0.15 part(s) |
| HPO | 0.125 part(s) |
| TEPY | 0.10 part(s) |
| EDTA | 0.00375 part(s) |
| Ferrous sulfate | 0.00225 part(s) |
| OLK | 0.713 part(s) |
| Deionized water | 200 part(s) |

The polymerization conversion to the resultant rubber polymer was almost 100%.

To the rubber polymer latex, the following composition of monomers and polymerization aids in aqueous solution was added and subjected to 2.5 hours of graft polymerization at 60° C.

| | |
|---|---|
| MMA | 10.5 part(s) |
| BA | 2.0 part(s) |
| t-BHP | 0.1 part(s) |
| SFS | 0.12 part(s) |
| Deionized water | 4.2 part(s) |

Then, the following composition of monomer and polymerization aids in aqueous solution was added and subjected to 3 hours of graft polymerization.

| | |
|---|---|
| St | 12.5 part(s) |
| t-BHP | 0.1 part(s) |
| SFS | 0.2 part(s) |
| Deionized water | 6.7 part(s) |

The rubber polymer and resultant graft copolymer B-8 after post-treatment showed characterizing parameters as shown in Table 2.

SYNTHESIS EXAMLEe 17: GRAFT COPOLYMER B-9

Emulsion polymerization was performed for 20 hours at 60° C. in a similar manner as in Synthesis Example 16 except that the composition therefor was varied by replacing the 11.25 parts of 4-VB with 11.25 parts of 2-vinylnaphthalene (purity: 98%, abbreviated as "2-VN") and changing the amount of HPO to 0.15 part.

The resultant rubber latex was subjected to two stages of graft polymerization under the same conditions as in Synthesis Example 16.

The resultant rubber polymer and graft copolymer B-9 after post-treatment showed characterizing parameters as shown in Table 2.

EXAMPLE 1

A composition according to the present invention was prepared by blending 80 parts of the copolymer A-1 obtained in Synthesis Example 1 and 20 parts of the graft copolymer B-1 obtained in Synthesis Example 8, and the properties of the composition were measure according to the respective methods described hereinbefore.

EXAMPLE 2

A composition was prepared and evaluated in a similar manner as in Example 1 except that the composition comprised 84 parts of the copolymer A-1 and 16 parts of the graft copolymer B-2 having an increased rubber content of 80 wt. % prepared in Synthesis Example 9.

EXAMPLES 3 and 4

Compositions were prepared and evaluated in a similar manner as in Example 1 except that the copolymer A-1 was replaced by the copolymer A-2 having an increased αMS content (in Example 3) or by the copolymer A-3 having a larger AN content than the copolymer A-2 (in Example 4).

EXAMPLE 5

A composition was prepared and evaluated in a similar manner as in Example 2 except that the copolymer A-1 was replaced by the copolymer A-3.

COMPARATIVE EXAMPLES 1 AND 2

Compositions were prepared and evaluated in a similar manner as in Example 1 except that the compositions were prepared by blending the graft copolymer B-4 obtained by using a butadiene/styrene copolymer as the rubber polymer with the copolymer A-1 (Comparative Example 1) or with the copolymer A-3 (Comparative Example 3).

EXAMPLES 6 AND 7

Compositions were prepared and evaluated in a similar manner as in Example 1 except that the compositions were prepared by blending 30 parts of the graft copolymer B-3 having an increased refractive index by the use of 4-IPB with 70 parts of the copolymer A-4 (Example 6) or the copolymer A-5 (Example 7) each having an increased refractive index based on an increased αMS content.

COMPARATIVE EXAMPLES 3 AND 4

Compositions were prepared and evaluated in similar manner as in Examples 6 and 7 except that the graft copolymer B-3 used in Examples 6 and 7 was replaced by the graft copolymer B-5 having an increased refractive index by the use of an increased amount of St.

COMPARATIVE EXAMPLES 5-7

Evaluation was made similarly as in Example 7 with respect to blends of the high-refractive index copolymer A-6 excluding MMA from its components with the graft copolymer B-1 (Comparative Example 5) and with the graft copolymer B-3 (Comparative Example 6), and also a mixture of the copolymer A-7 having an increased refractive index similarly as the copolymer A-6 with the graft copolymer B-3 (Comparative Example 7).

EXAMPLES 8 AND 9

Compositions were prepared and evaluated in a similar manner as in Example 1 except that the compositions were prepared by changing the blend ratio of the copolymer A-1/the graft copolymer B-1 to 60 parts/40 parts (Example 8) or to 70 parts/30 parts (Example 9).

EXAMPLE 10

A composition was prepared and evaluated in a similar manner as in Example 1 except for replacing the graft copolymer B-1 with the graft copolymer B-6 containing 3-IPB also as a grafting component.

EXAMPLES 11-13

Compositions were prepared and evaluated in a similar manner as in Example 1 except that the compositions were prepared by blending 70 parts of the copolymer A-8 with 30 parts each of the graft copolymers B-7 (Example 11), B-8 (Example 12) and B-9 (Example 13) containing 2-IPN, 4-VB and 2-VN, respectively, as the comonomer with butadiene for constituting the rubber polymer in each graft copolymer.

The particulars of the compositions obtained in the above Examples 1-13 and Comparative Examples 1-7 and the physical properties thereof are inclusively shown in Table 3 appearing hereinafter.

EVALUATION

As is shown in Table 2, compared with conventional graft copolymers (B-4 and B-5) obtained by using styrene-butadiene rubber as the trunk rubber component, the graft copolymers (B-1 to B 3 and B-6 to B-9) according to the present invention obtained by using a copolymer of an aromatic polycyclic vinyl monomer and butadiene as the trunk rubber component show an identical refractive index at a smaller aromatic polycyclic vinyl monomer content and accordingly can provide the rubber component with a lower glass transition temperature.

As a result, as is shown in Table 3, the thermoplastic resin compositions according to the present invention containing the graft copolymers B-1 to B-3 and B-6 to B-9 obtained from such an aromatic polycyclic vinyl monomer/butadiene copolymer as the rubber component together with the copolymers A-1 to A-5 and A-8 according to the present invention, are provided with a high heat distortion temperature, a high transparency and an excellent impact resistance. It is also shown that, if the composition of the copolymer (A) is outside the range of the present invention, it results in a lower polymerization yield (Copolymer A-7 in Table 1) or remarkably lower impact resistance and transparency (Comparative Examples 5-7 using the copolymers A-6 and A-7). Further, as is understood from, e.g., Examples 6, 7, 9 and 11-13, thermoplastic resin compositions excellent in balance among heat distortion temperature, transparency and impact resistance are obtained by using any of vinyl and isopropenyl compounds of either biphenyl or naphthalene type.

As has been described above, according to the present invention, a thermoplastic resin composition with excellent balance among transparency, heat resistance and impact resistance can be obtained by blending a copolymer (A) comprising αMS, MMA and AN so as to provide a good combination of heat resistance and refractive index with a graft copolymer (B) obtained by graft-polymerizing a vinyl monomer onto a rubber copolymer of an aromatic polycyclic vinyl monomer and butadiene having a high refractive index and a low glass transition temperature.

TABLE 1

| Co-polymer | Composition (parts) αMS | MMA | AN | Conversion (%) | Glass transition temp. (°C.) | Refractive index ($n_D^{25}$) |
|---|---|---|---|---|---|---|
| A-1 | 35.0 | 45.0 | 20.0 | 92 | 113 | 1.532 |
| A-2 | 44.0 | 46.0 | 10.0 | 93 | 122 | 1.533 |
| A-3 | 44.0 | 43.0 | 13.0 | 93 | 118 | 1.533 |
| A-4 | 50.0 | 30.0 | 20.0 | 92 | 126 | 1.548 |
| A-5 | 56.0 | 33.0 | 11.0 | 90 | 130 | 1.548 |
| A-6 | 70.0 | — | 30.0 | 94 | 133 | 1.567 |
| A-7 | 75.0 | — | 25.0 | 88 | 138 | 1.569 |
| A-8 | 43.0 | 42.0 | 15.0 | 96 | 116 | 1.538 |

TABLE 2

Graft copolymer composition and properties

| Graft copolymer | Rubber component (parts) BD | Aromatic polycyclic vinyl monomer | St | DVB | First graft component (parts) MMA | BA | St | 3-IPB | Second graft component (parts) MMA | St | 3-IPB | GTT *1 (°C.) | Refractive index ($n_D^{25}$) | Average particle size (nm) |
|---|---|---|---|---|---|---|---|---|---|---|---|---|---|---|
| B-1 | 56.6 | 3-IPB | 8.4 | — | 12.25 | — | 5.25 | — | 12.25 | 5.25 | — | −62 | 1.532 | 250 |
| B-2 | 69.7 | 3-IPB | 10.3 | — | 7.0 | — | 3.0 | — | 7.0 | 3.0 | — | −62 | 1.533 | 288 |
| B-3 | 60.0 | 4-IPB | 15.0 | — | 0.15 | 10.5 | 2.0 | — | — | — | 12.5 | — | −41 | 1.547 | 200 |
| B-4 | 55.0 | — | 10.0 | — | 12.25 | — | 5.25 | — | 12.25 | 5.25 | — | −58 | 1.529 | 261 |
| B-5 | 45.0 | — | 30.0 | 0.15 | 10.4 | 2.0 | — | — | — | 12.5 | — | −23 | 1.548 | 110 |
| B-6 | 60.6 | 3-IPB | 4.4 | — | 10.5 | — | 5.0 | 2.0 | 10.5 | 5.0 | 2.0 | −63 | 1.532 | 327 |
| B-7 | 65.25 | 2-IPN | 9.75 | — | 10.5 | 2.0 | — | — | — | 12.5 | — | −49 | 1.537 | 236 |
| B-8 | 63.75 | 4-VB | 11.25 | — | 0.15 | 10.5 | 2.0 | — | — | — | 12.5 | — | −57 | 1.537 | 220 |
| B-9 | 63.75 | 2-VN | 11.25 | — | 0.15 | 10.5 | 2.0 | — | — | — | 12.5 | — | −56 | 1.537 | 227 |

*1: GTT: Glass transition temperature of the rubber component

TABLE 3

Resin composition and properties (Examples and Comparative Examples)

| Ex. or Comp. Ex. | Copolymer A | Graft copolymer B | Blend ratio A/B (parts/parts) | Heat distortion temp. (°C.) | Total light transmittance (%) | Izod impact strength (kg · cm/cm) |
|---|---|---|---|---|---|---|
| Ex. 1 | A-1 | B-1 | 80/20 | 103 | 83 | 12 |
| Ex. 2 | A-1 | B-2 | 84/16 | 104 | 82 | 11 |
| Comp. Ex. 1 | A-1 | B-4 | 80/20 | 103 | 74 | 6 |
| Ex. 3 | A-2 | B-1 | 80/20 | 106 | 81 | 10 |
| Ex. 4 | A-3 | B-1 | 80/20 | 103 | 84 | 11 |
| Ex. 5 | A-3 | B-2 | 84/16 | 105 | 82 | 10 |
| Comp. Ex. 2 | A-3 | B-4 | 80/20 | 103 | 75 | 5 |
| Ex. 6 | A-4 | B-3 | 70/30 | 100 | 79 | 7 |
| Comp. Ex. 3 | A-4 | B-5 | 70/30 | 103 | 78 | 2 |
| Ex. 7 | A-5 | B-3 | 70/30 | 106 | 81 | 6 |
| Comp. Ex. 4 | A-5 | B-5 | 70/30 | 110 | 78 | 1 |
| Comp. Ex. 5 | A-6 | B-1 | 70/30 | 108 | 11 | 5 |
| Comp. Ex. 6 | A-6 | B-3 | 70/30 | 113 | 13 | 1 |
| Comp. Ex. 7 | A-7 | B-3 | 70/30 | 115 | 10 | 1 |
| Ex. 8 | A-1 | B-1 | 60/40 | 96 | 85 | 26 |
| Ex. 9 | A-1 | B-1 | 70/30 | 99 | 84 | 14 |
| Ex. 10 | A-1 | B-6 | 80/20 | 103 | 81 | 12 |
| Ex. 11 | A-8 | B-7 | 70/30 | 103 | 83 | 11 |
| Ex. 12 | A-8 | B-8 | 70/30 | 100 | 82 | 10 |
| Ex. 13 | A-8 | B-9 | 70/30 | 101 | 82 | 11 |

What is claimed is:

1. A thermoplastic resin composition, comprising: 50-95 wt. % of a copolymer (A) of 10-75 wt. % of α-methyl styrene, 10-60 wt. % of methyl methacrylate, 5-35 wt. % of acrylonitrile and 0-20 wt. % of a monomer copolymerizable therewith, and 5-50 wt. % of a graft copolymer (B) comprising 50-85 wt. parts of a butadiene-based rubber polymer and 15-50 wt. parts of a vinyl monomer graft-polymerized onto the rubber polymer, the total of the rubber polymer and the vinyl monomer being 100 wt. parts; said butadiene-based rubber polymer comprising 50-98 wt. % of butadiene, 2-50 wt. % of an aromatic polycyclic vinyl monomer represented by a formula (I) below and 0-20 wt. % of a monomer copolymerizable therewith:

Formula (I)

wherein R denotes an optionally substituted biphenylyl or naphthyl group, and $R_1$ denotes a hydrogen atom or a methyl group.

2. A composition according to claim 1, wherein each of said copolymer (A) and graft copolymer (B) has a refractive index $n_D$ at 25° C. of 1.52-1.56.

3. A composition according to claim 1, wherein said copolymer (A) comprises 20-70 wt. % of α-methylstyrene, 10-60 wt. % of methyl methacrylate, 10-30 wt % of acrylonitrile and 0-20 wt. % of a monomer copolymerizable therewith.

4. A composition according to claim 1, wherein the copolymerizable monomer for constituting the copolymer (A) is selected from the group consisting of styrene, methacrylonitrile, methacrylic acid, acrylic acid, N-methylmaleimide, N-phenylmaleimide, and N-cyclohexylmaleimide.

5. A composition according to claim 1, wherein said butadiene-based rubber polymer constituting the graft copolymer (B) comprises 75-95 wt. % of butadiene, 5-25 wt. % of an aromatic polycyclic vinyl monomer and 0-20 wt. % of a monomer copolymerizable therewith.

6. A composition according to claim 1, wherein said aromatic polycyclic vinyl monomer is selected from the group consisting of 4-isopropenylbiphenyl, 3-isopropenylbiphenyl, 4-vinylbiphenyl, 2-isopropenylnaphthalene, 2-vinylnaphthalene and alkyl-substituted derivatives thereof.

7. A composition according to claim 1, wherein said aromatic polycyclic vinyl monomer is 3-isopropenylbiphenyl.

8. A composition according to claim 1, wherein the copolymerizable monomer constituting the butadiene-based rubber polymer in the graft copolymer (B) is selected from the group consisting of styrene, α-methylstyrene, acrylonitrile, methacrylonitrile, acrylic acid, methacrylic acid, methyl acrylate, ethyl acrylate, butyl acrylate, ethylhexyl acrylate, methyl methacrylate, ethyl methacrylate and butyl methacrylate.

9. A composition according to claim 1, wherein the butadiene-based rubber polymer constituting the graft copolymer (B) further contains as a constituent a polyfunctional monomer in a proportion of 10 wt. % or less of the total of the monomers constituting the butadiene-based rubber polymer excluding the polyfunctional monomer.

10. A composition according to claim 1, wherein the butadiene-based rubber polymer constituting the graft copolymer (B) has an average particle size of 150-800 nm.

11. A composition according to claim 1, wherein the butadiene-based rubber polymer constituting the graft copolymer (B) has a glass transition temperature of −20° C. or below.

12. A composition according to claim 1, wherein the vinyl monomer graft-polymerized for constituting the graft copolymer (B) is at least one monomer selected from the group consisting of aromatic vinyl compounds, vinyl cyanides, acrylic acid, methacrylic acid, alkyl acrylates, alkyl methacrylates, maleimide monomers, maleic anhydride, derivatives of the above monomers, and aromatic polycyclic vinyl monomers represented by the formula (I).

13. A composition according to claim 1, wherein the production of the copolymer (A), the production of the butadiene-based rubber polymer constituting the graft copolymer (B) and the graft-polymerization for producing the graft copolymer (B) have been respectively performed by emulsion polymerization.

14. A composition according to claim 1, which shows a heat distortion temperature of at least 90° C., a total light transmittance of at least 78%, and an Izod impact strength of at least 6 Kg.cm/cm.

* * * * *